US012809655B2

(12) United States Patent
Xia et al.

(10) Patent No.: US 12,809,655 B2
(45) Date of Patent: Nov. 24, 2026

(54) MANAGEMENT METHOD AND APPARATUS FOR CONTAINER CLUSTER

(71) Applicant: Huawei Technologies Co., Ltd., Shenzhen (CN)

(72) Inventors: Haitao Xia, Beijing (CN); Ulrich Kleber, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 586 days.

(21) Appl. No.: 18/342,472

(22) Filed: Jun. 27, 2023

(65) Prior Publication Data

US 2023/0342183 A1 Oct. 26, 2023

Related U.S. Application Data

(63) Continuation of application No. PCT/CN2020/140276, filed on Dec. 28, 2020.

(51) Int. Cl.
*G06F 9/455* (2018.01)

(52) U.S. Cl.
CPC .................... *G06F 9/45558* (2013.01); *G06F 2009/45595* (2013.01)

(58) Field of Classification Search
CPC ....... G06F 9/45558; G06F 2009/45595; H04L 41/0843; H04L 41/0895; H04L 41/342; H04L 41/40
See application file for complete search history.

(56) References Cited

U.S. PATENT DOCUMENTS 10,841,152 B1 11/2020 Humphreys
2014/0201374 A1* 7/2014 Ashwood-Smith ....... G06F 9/50 709/226
2017/0293762 A1* 10/2017 Karhunen ................. G06F 9/54
2019/0045355 A1* 2/2019 Akhavain Mohammadi ............... H04W 8/24
2019/0146827 A1* 5/2019 Yu ....................... H04L 41/0897 709/226
2020/0412596 A1* 12/2020 Cherunni .............. G06F 9/5077
2021/0144056 A1* 5/2021 Chakrapani Rangarajan ............. H04L 41/5012
2021/0224093 A1* 7/2021 Fu ......................... G06F 9/5072
2022/0035650 A1* 2/2022 Banerjee ............. H04L 12/4641
2022/0158926 A1* 5/2022 Wennerström .......... H04L 43/50
2022/0283792 A1* 9/2022 Kumar .................. H04L 41/046
2023/0208700 A1* 6/2023 Qian ................... H04L 41/0631 709/224

(Continued)

FOREIGN PATENT DOCUMENTS

CN 109814881 A 5/2019
CN 111385114 A 7/2020

(Continued)

*Primary Examiner* — Kenneth Tang
(74) *Attorney, Agent, or Firm* — Slater Matsil, LLP

(57) ABSTRACT

Embodiments of this application provide a management method for a container cluster. The method includes: A container cluster management CCM receives an instantiation request message of a container cluster from a management entity, where the request message carries an instantiation parameter of the container cluster; and the CCM instantiates the container cluster based on the instantiation parameter of the container cluster, where the instantiation parameter of the container cluster is determined by the management entity by accessing a container cluster descriptor CCD.

19 Claims, 8 Drawing Sheets

(56) References Cited

U.S. PATENT DOCUMENTS

2024/0012674 A1* 1/2024 Xie ........................ G06F 9/5077

FOREIGN PATENT DOCUMENTS

JP 2017538204 A 12/2017
WO 2020177564 A1 9/2020

* cited by examiner

MANAGEMENT METHOD AND APPARATUS FOR CONTAINER CLUSTER

CROSS-REFERENCE TO RELATED APPLICATIONS

This application is a continuation of International Application No. PCT/CN2020/140276, filed on Dec. 28, 2020, the disclosure of which is hereby incorporated by reference in its entirety.

TECHNICAL FIELD

This application relates to the communications field, and in particular, to a management method and apparatus for a container cluster.

BACKGROUND

Network function virtualization (NFV) means that a telecommunication network operator carriers out software and hardware decoupling on the implementation of a part of telecommunication network functions (such as a core network function) in a general-purpose server, a switch, and a memory by using a virtualization technology in the field of information technology (IT), so as to implement fast and efficient deployment and operating of a network service (NS), while achieving a goal of saving capital expense CAPEX and operating expense OPEX of a network. By applying the NFV technology, the telecommunication network functions are implemented in a form of software, can be run on general-purpose server hardware, and can be migrated to, instantiated at, or deployed at different physical positions of the network as required without installation of a new device.

Standardization work of the NFV mainly focuses on a network service, a virtualized network function (VNF), and dynamic management and orchestration (MANO) of a virtual resource, where function formulation work in the MANO framework is completed by the interface and architecture (IFA) working group of the NFV industry standard group under the European Telecommunications Standards Institute (ETSI), and a functional architecture of the NFV is shown in FIG. 1, where an NFV system 100 mainly includes the following functional entities:

NFV orchestrator (NFVO) 102: It is mainly responsible for life cycle management of an NS, and responsible for allocation and scheduling of a virtual resource in a network functions virtualization infrastructure (NFVI) 104. The NFVO 102 may communicate with one or more virtualized network function managers (VNFM) 106, and perform an operation related to NS instantiation, for example, send corresponding configuration information to the VNFM 106, or request status information of one or more VNFs 108 from the VNFM 106. In addition, the NFVO 102 may further communicate with a virtualized infrastructure manager (VIM) 110, to perform allocation and/or reservation on each resource in the NFVI 104, and exchange resource configuration and status information, and the like.

VNFM 106: It is mainly responsible for life cycle management of the one or more VNFs 108, for example, instantiating the VNF 108, updating the VNF 108, querying the VNF 108, scaling the VNF 108, and terminating the VNF 108. The VNFM 106 may communicate with the VNF 108, to manage a life cycle of the VNF 108, and exchange configuration information, status information, and the like with the VNF. It may be understood that the NFV system 100 may include one or more VNFMs 106, and the VNFMs 106 perform life cycle management on different types of VNFs 108 respectively.

NFVI 104: It is an infrastructure of the NFV system 100, and includes a hardware component, a software component, and a combination thereof, so as to establish a virtualized environment, and deploy, manage, and implement the VNF 108 in the virtualized environment. The NFVI 104 may include at least computing hardware 1041, storage hardware 1042, and network hardware 1043. A virtualization layer 1044 of the NFVI 104 may abstract the foregoing hardware, and decouple the hardware from the VNF 108, to obtain a corresponding virtual computing resource 1045, a virtual storage resource 1046, and a virtual network resource 1047, so as to provide a virtual machine and a virtual container in another form for the VNF 108.

VIM 110: It is mainly configured to control and manage interaction between the VNF 108 and the computing hardware 1041, the storage hardware 1042, the network hardware 1043, the virtual computing resource 1045, the virtual storage resource 1046, and the virtual network resource 1047. For example, the VIM 110 may perform a resource management function, for example, specifically, adding a corresponding virtual resource to a virtual machine or a virtual container in another form, and collecting fault information of the NFVI 104 in a system running process. In addition, the VIM 110 may communicate with the VNFM 106, for example, receiving a resource allocation request from the VNFM 106, and feeding back resource configuration and status information to the VNFM 106.

VNF 108: The VNF 108 includes one or more VNFs (usually a plurality of VNFs), and may run one or more virtual machines or virtual containers in another form, to correspond to a group of network functions originally implemented by a dedicated device.

Element management system (EMS) 112: It may be configured to configure and manage the VNF 108, and initiate a life cycle management operation such as instantiation of a new VNF 108 to the VNFM 106. It may be understood that the NFV system 100 may include one or more EMSs 112.

Operations support system (OSS) or business support system (BSS) 114: It can support various end-to-end telecommunication businesses. Management functions supported by the OSS may include network configuration, business provision, fault management, and the like; and the BSS may be configured to process related businesses such as order, payment, and revenue, and support functions such as product management, order management, revenue management, and customer management. It should be noted that the OSS/BSS 114 may be used as a business requester to request the NFVO to instantiate the NS, and the OSS/BSS 114 or a computing device that the OSS/BSS 114 depended on may be generally correspondingly referred to as the business requester.

It may be understood that in the NFV system 100 shown in FIG. 1, the foregoing functional entities may be separately deployed in different computing devices, or some functional entities may be integrated into a same computing device.

Currently, the network transformation in the telecommunication field is undergoing the process of evolving from network function virtualization (NFV) to cloud-native. Cloud-native is a new system implementation paradigm for building, running, and managing software in a cloud environment, and is an architecture practice that makes full use of cloud infrastructure and platform services, adapts to the cloud environment, and has key features such as (micro)

servitization, scaling, distributed, high availability, multi-tenant, and automation. In this transformation, introduction of container management into a reference architecture of NFV management and orchestration (MANO) is a key link of many practices of the evolution from the NFV to the cloud-native.

Container as a service (CaaS) is a specific type of platform as a service (PaaS). Generally, a container is an operating system-level virtualization technology that isolates different processes by using operating system isolation technologies, such as CGroup and NameSpace in Linux. Different from a hardware virtualization (Hypervisor) technology, the container technology does not have virtual hardware and there is no operating system but only processes inside the container. By virtue of this important feature of the container technology, the container is more lightweight and easier to manage in comparison with a virtual machine. In a running state of the container, a group of common management operations are defined, such as starting, stopping, pausing, and deleting, to manage a life cycle of the container in a unified manner. The Kubernetes project of the Cloud Native Computing Foundation is the de facto standard currently recognized in the industry for container management and orchestration.

Introduction of a container as a service architecture in the evolution process of the telecommunication network cloud-native brings agility transformation to DevOps of the telecommunication industry. The change corresponding to the transformation is that the conventional large-granularity single-network function is gradually deconstructed and servitized, or even is further micro-servitized. Each servitized function is independently developed, delivered, and maintained, and upgrade of a version becomes more frequent. However, a surge of containerized network functions does not exponentially increase the workload of interoperability tests. Stable API interface definition ensures the consistency and reliability of interface function invoking.

Currently, a most popular application in the container management and orchestration field is Google's Kubernetes (K8S for short) container cluster management technology based on an open-source platform. A core idea of the Kubernetes is that "everything is service-centric and runs around services". Based on this idea, a container application system built on the Kubernetes can independently run on a physical machine, a virtual machine, or an enterprise private cloud, and can also be hosted on a public cloud. Another feature of the Kubernetes is automation, where a service can be automatically scaled, automatically diagnosed, and easily upgraded.

The function scope of the container cluster management includes container cluster management (creating or deleting a container cluster) and container cluster node management (adding/deleting nodes in a cluster and elastically updating a size of the cluster). The container cluster may be dynamically created as required, that is, the NFV MANO determines a quantity of created container clusters and a capacity of each cluster based on a size of a managed containerized VNF and a reliability policy.

In a dynamic management mode of the container cluster, how to manage the container cluster to make creation or update of the container cluster simple and quick and batch operations more efficient is particularly important in large-scale containerized VNF management and orchestration of a telecommunication cloud. Currently, the open source community has some basic container cluster management prototype tools, such as Google Kubeadm. However, these prototype tools cannot meet the requirements of large-scale container cluster deployment and management of the telecommunication cloud.

SUMMARY

To resolve the foregoing technical problems in the prior art, embodiments of this application provide a management method and apparatus for a container cluster node resource pool. Details are as follows:

Embodiments of this application provide a management method for a container cluster node resource pool, where the method includes:

A container cluster management CCM receives an instantiation request message of a container cluster from a management entity, where the request message carries an instantiation parameter of the container cluster; and the CCM instantiates the container cluster based on the instantiation parameter of the container cluster, where the instantiation parameter of the container cluster is determined by the management entity by accessing a container cluster descriptor CCD.

The method further includes:

The CCM receives an instantiation request message of a container cluster node from a management entity, where the request message carries an instantiation parameter of the container cluster node, and the instantiation parameter of the container cluster node is determined by the management entity by accessing a container cluster node descriptor CCND; or the CCM accesses the CCND to determine the instantiation parameter of the container cluster node.

The CCM instantiates the container cluster node based on the instantiation parameter of the container cluster node; and instantiates a CISM instance and a CIS instance on the container cluster node based on the instantiation parameter of the container cluster.

The method further includes: The CCM receives an updating request message of a container cluster from a management entity, where the request message carries a parameter of a to-be-updated container cluster instance, and the CCM updates the container cluster instance based on the parameter of the to-be-updated container cluster instance.

The method further includes: The CCM receives a deletion request message of a container cluster from a management entity, where the deletion request message carries identification information of a to-be-deleted container cluster instance and/or a type of a deletion operation; and the CCM deletes the container cluster instance.

Embodiments of this application provide a management system for a container cluster, where the system includes: a management entity, configured to determine an instantiation parameter of the container cluster based on a container cluster descriptor CCD, and send the instantiation parameter of the container cluster to a container cluster management CCM; and the CCM, configured to instantiate the container cluster based on the instantiation parameter of the container cluster.

The management entity is further configured to access a container cluster node descriptor CCND, to determine an instantiation parameter of a container cluster node; and send the instantiation parameter of the container cluster node to the CCM.

The CCM instantiates the container cluster node based on the instantiation parameter of the container cluster node, and instantiates a CISM instance and a CIS instance on the container cluster node based on the instantiation parameter of the container cluster.

Embodiments of this application further provide a management apparatus for a container cluster, including modules configured to perform the foregoing method steps.

Embodiments of this application further provide a management apparatus for a container cluster, including a processor and a memory, where the processor is coupled to the memory, and the memory stores a computer program; and the processor is configured to invoke the computer program in the memory, to enable the management apparatus to perform the foregoing method.

Embodiments of this application further provide a computer-readable storage medium, where the storage medium stores a computer program. When the computer program is executed, the foregoing method is performed.

Embodiments of this application further provide a computer program product, where the computer program product includes computer program code. When the computer program code is run on a computing device, the computing device is enabled to perform the foregoing method.

By means of the solution of embodiments of the present invention, a container cluster descriptor template and a container cluster node descriptor template are defined, dynamic management for a container cluster is supported, and large-scale container cluster consistent deployment and batch replication are implemented.

BRIEF DESCRIPTION OF THE DRAWINGS

Accompanying drawings that need to be used in the description of embodiments or the prior art are simply described below.

DETAILED DESCRIPTION OF ILLUSTRATIVE EMBODIMENTS

Technical solutions in embodiments of this application are described below with reference to the accompanying drawings in embodiments of this application.

Figure 1:
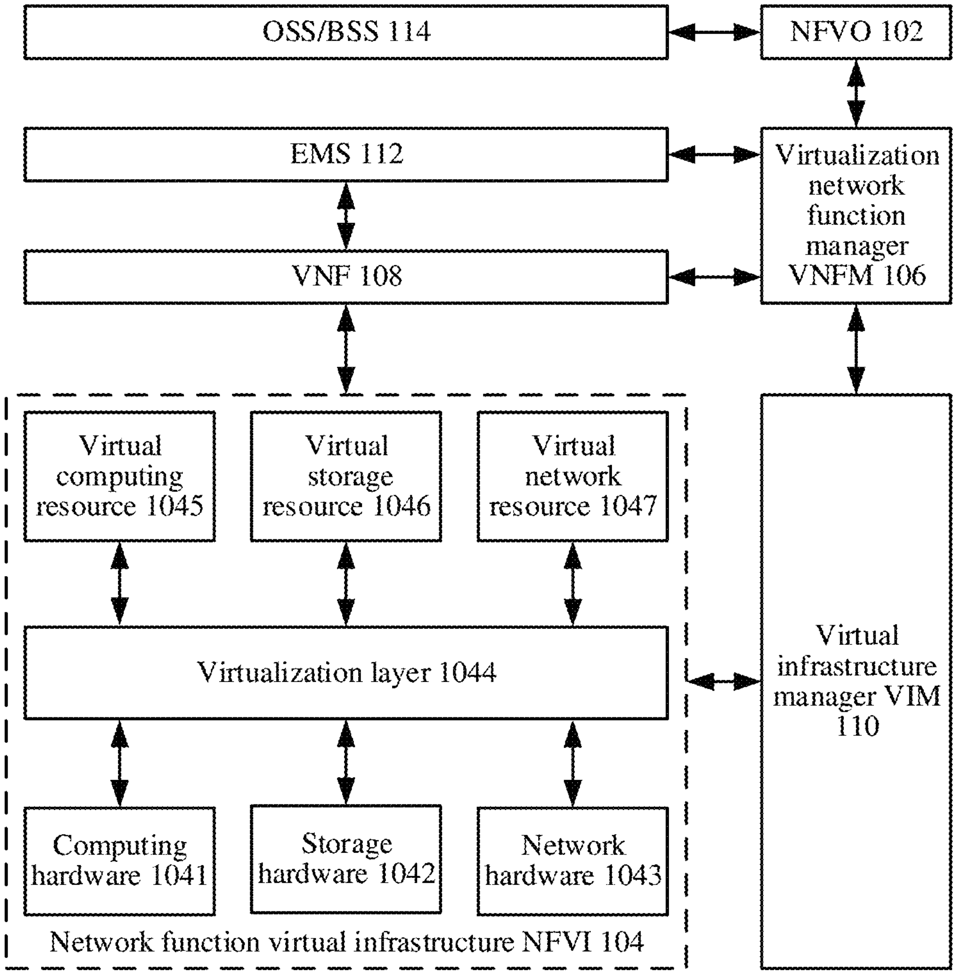
FIG. 1 is a framework diagram of an NFV system in the prior art.
Figure 2:
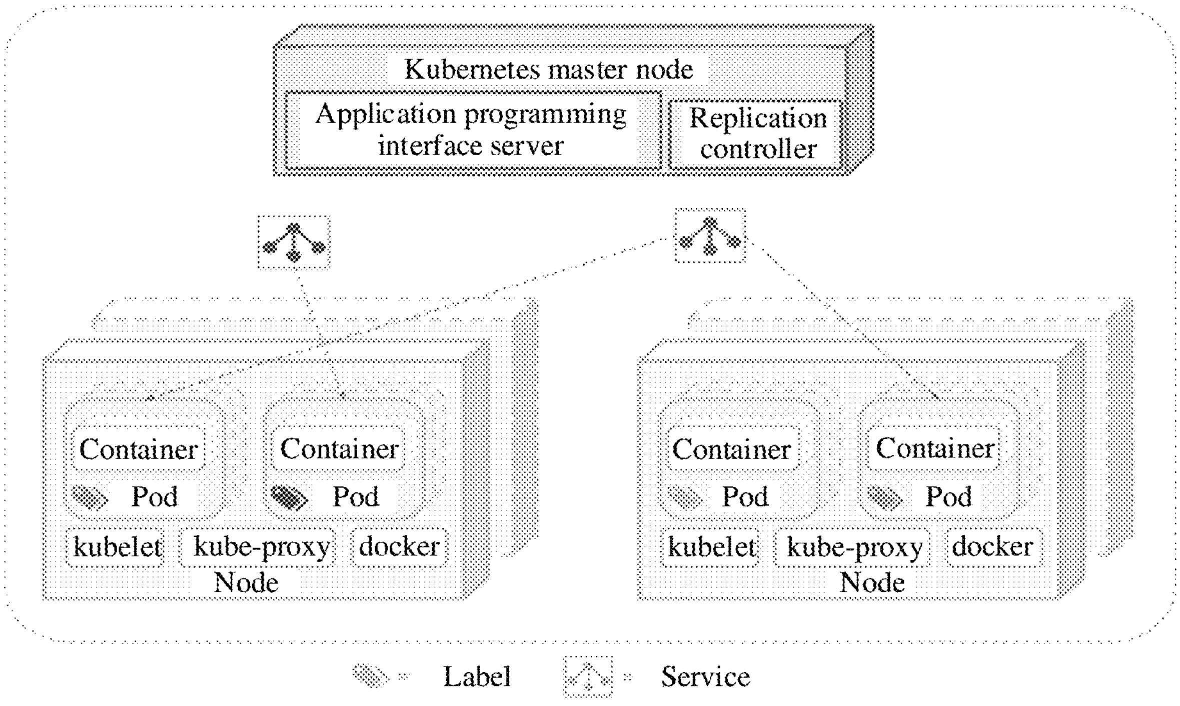
FIG. 2 is an architectural diagram of a Kubernetes (K8S) container management and orchestration system according to embodiments of this application.

Refer to FIG. 2, which is an architectural diagram of a Kubernetes (K8S) container management and orchestration system.

Kubernetes divides infrastructure resources in a container cluster into a Kubernetes master node (master) and a group of worker nodes (Nodes). A group of processes related to container cluster management run on the master node (also referred to as a management node), for example, an application programming interface server (API Server) and a replication controller (RC). These processes implement management functions such as resource management, container pod (Pod) scheduling, scaling, security control, system monitoring, and error correction of the entire container cluster. Such three components as Kubelet, Proxy, and Docker are run on each worker node, and are responsible for managing a life cycle of a pod on the current node and implementing a service proxy function. As shown in FIG. 2, a pod may include at least one container. In this case, a pod may be understood as a container pod including one or more containers.

An API server provides a unique operation entry for resource objects and all other components need to operate resource data through an API interface provided by the API server, to implement related business functions by performing "full query" and "change monitoring" on related resource data.

A Controller Manager is the management and control center of the container cluster, and has a main objective of implementing automatic fault detection and recovery of the Kubernetes cluster. For example, replication or removal of pods can be performed based on the definition of the RC to ensure that the quantity of pod instances complies with the definition of the RC, and creating and updating of endpoints objects of a service, discovery, management and state monitoring of a node, and cleaning of locally cached image files can be performed based on the management relationship between the service and pods.

The Kubelet component is responsible for a full life cycle management, including creating, modifying, monitoring, and deleting pods on the current node. In addition, the Kubelet periodically reports status information of the current node to the API server.

The Proxy component is configured to implement load balancing between a proxy pattern and a software pattern of the service.

The Docker component is a running environment of the container.

Figure 3:
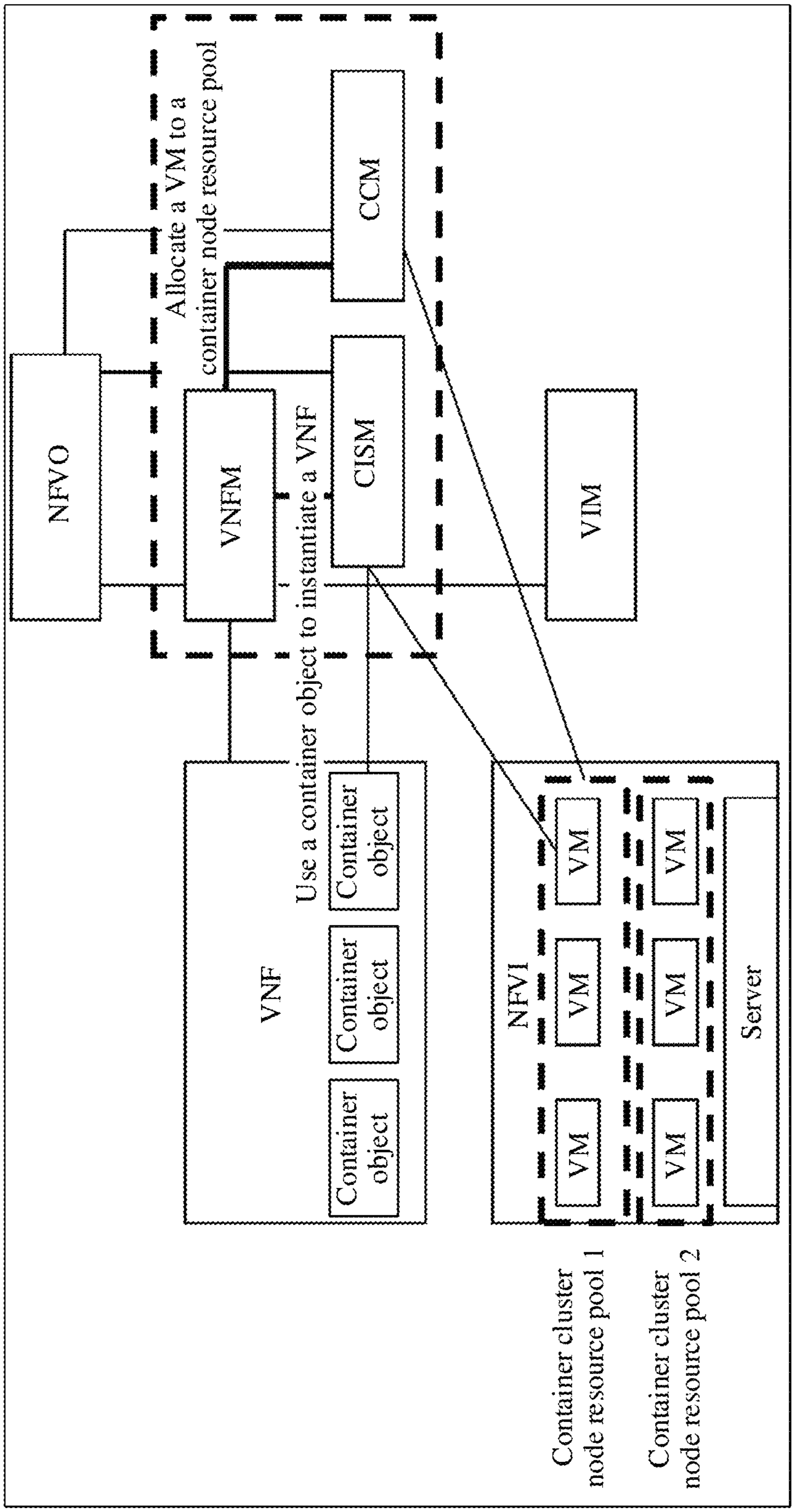
FIG. 3 is an architectural diagram of an NFV management and orchestration system for managing a container cluster according to embodiments of this application.

The NFV industry standard group under the European Telecommunications Standards Institute (ETSI) defines the standard functions of the NFV management and orchestration system management container in Release 4 characteristic work. As shown in FIG. 3, in the framework of this reference function, the management plane on the right has the following two newly introduced logical functions:

Container infrastructure service management (CISM) (also referred to as CaaS management, whose open source prototype is the Kubernetes) is responsible for managing container objects invoked by the containerized VNF, including creating, updating, and deleting container objects, and scheduling a container object to corresponding node resources (computing, storage, and network resources) in the container cluster node resource pool managed by the CISM. The corresponding concept of the container object in the ETSI standard is a managed container infrastructure object (MCIO).

Container cluster management (CCM) is responsible for managing a container cluster, including creating a node resource pool used by the container cluster and scaling the node. The container cluster is a set formed by a monitoring and management system (for example, the Kubernetes Master in FIG. 2) and a series of computing nodes (for example, the node in FIG. 2, which may be a physical server, a bare metal, or a virtual machine). The container cluster is a dynamic system, where a plurality of containers can be deployed in the system and the system can monitor statuses of these containers and communication between containers. The corresponding concept of the container cluster in the ETSI standard is a container infrastructure service cluster (CIS Cluster).

Figure 4:
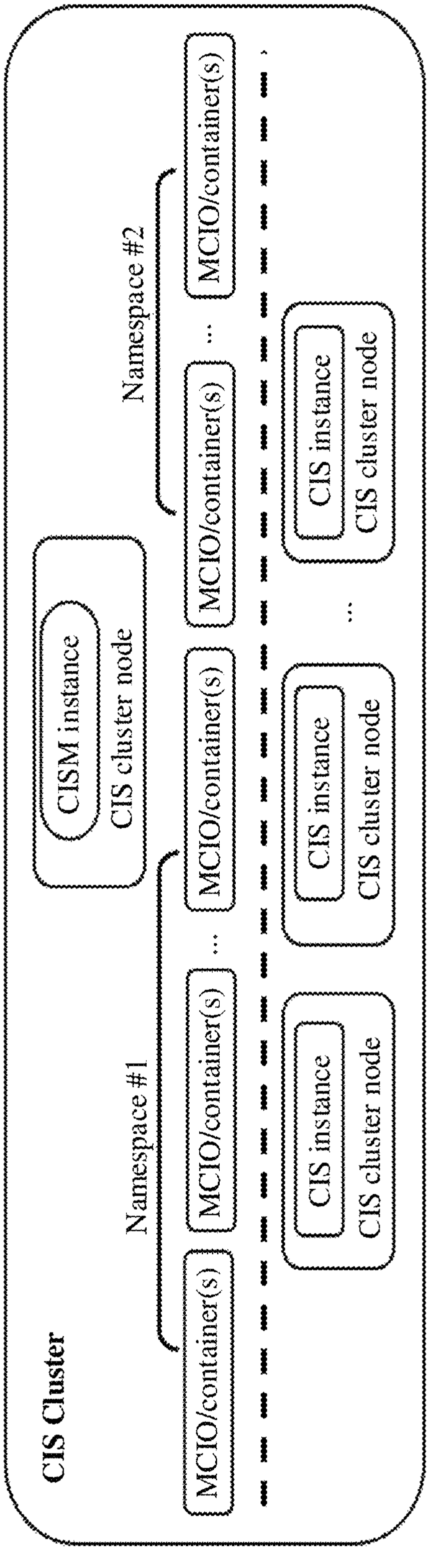
FIG. 4 is a diagram of a logical relationship between a container cluster, a container cluster node, and a namespace according to embodiments of this application.

A containerized VNF may be understood as a containerized workload (containerized workload) that encapsulates NFVI resources such as computing, storage, and network resources. The container object MCIO invoked by the workload is scheduled onto the node of the container cluster to run. The container cluster loads an image of a CISM instance (a CaaS management plane function, such as Kubernetes Master) or an image of a container infrastructure service (CIS) instance (a CaaS user plane function, such as kubelet, kube-proxy, and docker on the Kubernetes worker node) on the node. In the ETSI NFV standard, the CISM in each container cluster provides management functions such as creating, reading, updating, and deleting (CRUD) of a namespace. The namespace is a logical group formed by a group of specific identifiers, resources, policies, and authorizations, and has a function similar to that of a folder in a server. The NFVO may create a plurality of namespaces in the container cluster to isolate resources and identifiers of the container object MCIO of a plurality of tenants (that is, containerized VNF) in the container cluster through the namespaces. The relationship between the container cluster (CIS cluster), the container cluster node (CIS cluster node), and the namespaces (namespaces) is shown in FIG. 4. The CISM and the CCM provide the NFVO or VNFM with management services to invoke their functions on a northbound interface.

A solution of the present invention provides a management method for a container cluster based on an NFV template, where by defining a container cluster descriptor template and a container cluster node descriptor template, and applying a newly defined descriptor template in a container cluster management process, dynamic management of a container cluster is supported, and large-scale container cluster consistent deployment and batch replication are implemented.

The container cluster descriptor (CCD) is a type of NFV template file that describes deployment and operation behavior requirements of a container cluster and that is defined in embodiments of the present invention. For the CCD, refer to or use a template similar to that of a VNFD (Virtual Network Function Descriptor). The template includes but is not limited to the following basic deployment information:

Name information, identification information, provider information, and version information of the container cluster descriptor.

A size of the container cluster, that is, the maximum quantity of CISM instances and/or the maximum quantity of CIS instances included in the container cluster.

Basic characteristics of a scale operation of the container cluster, including a minimum step, a maximum step, and/or a reachable scaling level (Scale level) that may be performed by the container cluster during the scaling operation.

An affinity/anti-affinity rule of the entire container cluster is identification information of an affinity/anti-affinity group in which a container cluster instance created based on the CCD is located, and is for indicating an affinity/anti-affinity relationship between a container cluster instance created based on the CCD and a container cluster instance created based on another CCD. The affinity group is a logical relationship group formed based on resource similarity and the objects belonging to a same affinity group use similar resources during deployment, for example, all objects in an affinity group are deployed in a same data center; the anti-affinity group is a logical relationship group formed based on resource difference, the objects belonging to a same anti-affinity group use different resources during deployment, for example, all objects in the anti-affinity group are deployed in different data centers.

An affinity/anti-affinity rule between the CISM instances deployed in the container cluster refers to identification information of the affinity/anti-affinity group in which the CISM instances in the container cluster instance created based on the CCD is located, and is for indicating the affinity/anti-affinity relationship between the CISM instances in the container cluster instance created based on the CCD and another CISM instance in the same container cluster instance created based on the CCD.

An affinity/anti-affinity rule between the CIS instances deployed in the container cluster refers to identification information of the affinity/anti-affinity group in which the CIS instances in the container cluster instance created based on the CCD is located, and is for indicating the affinity/anti-affinity relationship between the CIS instances in the container cluster instance created based on the CCD and another CIS instance in the same container cluster instance created based on the CCD.

An affinity/anti-affinity rule between the CISM instances and the CIS instances that are deployed in the container cluster refers to identification information of the affinity/anti-affinity group in which the CISM instance and the CIS instance in the container cluster instance created based on the CCD are located, and is for indicating the affinity/anti-affinity relationship between the CISM instance in the container cluster instance created based on the CCD and the CIS instance in the container cluster instance created based on the CCD.

A feature of a primary container cluster external network (primary CIS cluster external network) refers to the basic configuration information of the primary external network of the container cluster instance created based on the CCD, for example, the feature requirements of the IP addresses and ports for the containers in the container cluster to connect to the external network. The primary container cluster external network is an external public network of the container cluster, where the containers (OS container) in the container cluster are indirectly connected to the external public network through the native network capability of the underlying container infrastructure layer.

A feature of a secondary container cluster external network (secondary CIS cluster external network) refers to the basic configuration information of a secondary external network of the container cluster instance created based on the CCD, for example, the feature requirements of the container network interface (CNI) used by the container cluster, where the secondary container cluster external network refers to an external exposed network of the container cluster and containers (OS container) in the container cluster are directly interconnected through another network interface different from the primary network interface.

A container cluster node descriptor (CCND, CIS Cluster Node Descriptor) is a type of NFV template file that describes deployment and operation behavior requirements of a container cluster node. The CCND is similar to the definition of a virtual computing or storage resource descriptor, including but not limited to the following deployment information:

Type of the container cluster node created based on the CCND, for example, indicating whether the type of the node is a physical machine (bare metal) or a virtual machine.

Requirements of the container cluster node created based on the CCND for hardware acceleration, network interfaces, and local storage.

An affinity/anti-affinity rule between nodes in the container cluster created based on the CCND refers to identification information of an affinity/anti-affinity group in which the container cluster node instance created based on the CCND is located, and is for indicating an affinity/anti-affinity relationship between the container cluster node (or referred to as a container cluster node instance) created based on the CCND and another container cluster node instance created based on the CCND.

Figure 5:
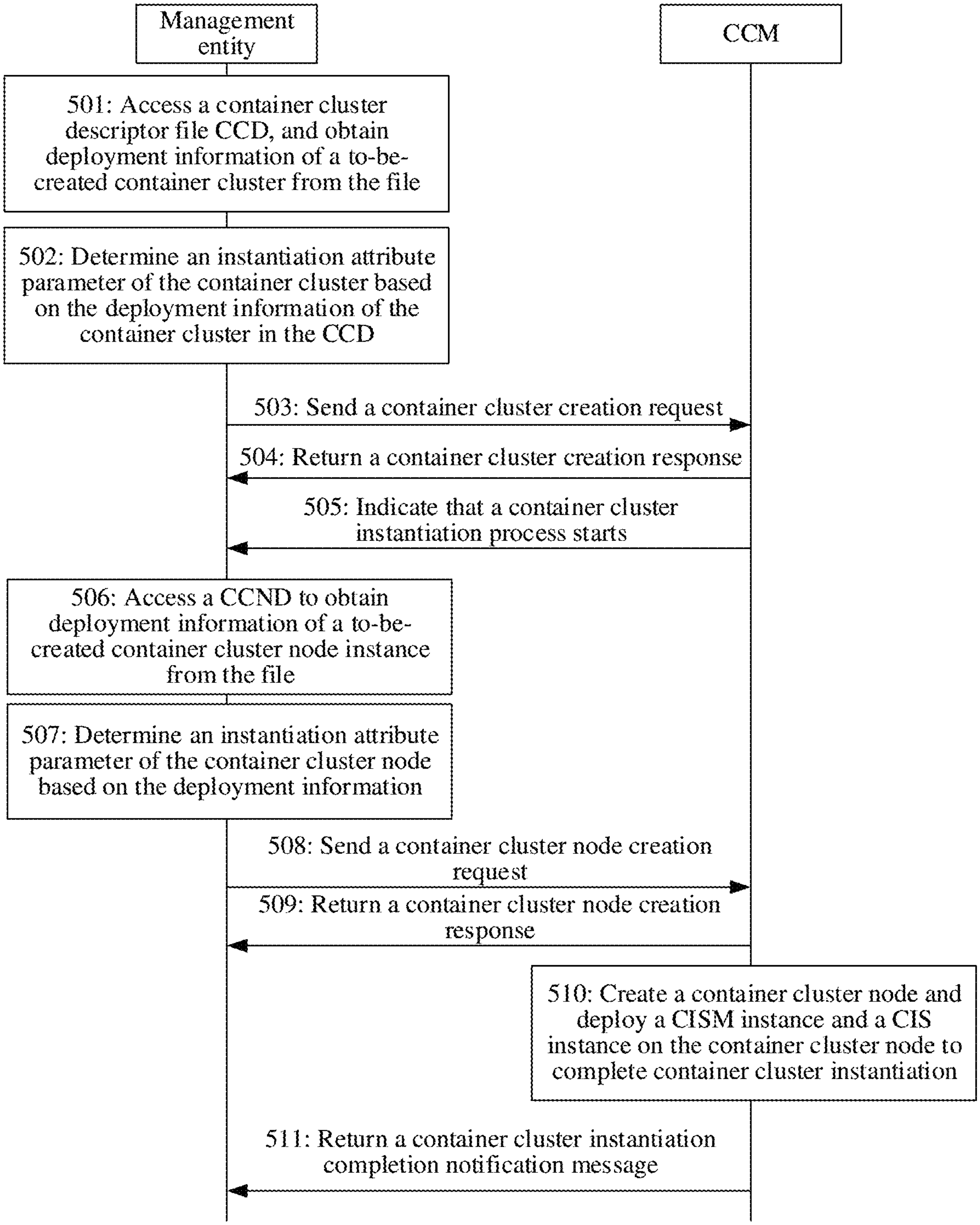
FIG. 5 is a schematic flowchart of creating a container cluster according to embodiments of this application.

Based on the foregoing template file, Embodiment 1 of the present invention provides a container cluster creation (or referred to as instantiation) method. As shown in FIG. 5, the method specifically includes the following steps:

Step 501: An NFV MANO management entity (or a management entity for short, the same below) accesses a container cluster descriptor CCD, and obtains deployment information of a to-be-created container cluster (or referred to as a container cluster instance) from a CCD file.

The management entity may be an NFVO or a VNFM, and which one specifically performs all steps of the method in this embodiment depends on a system configuration. This is not specifically limited herein.

Step 502: The management entity determines, based on the deployment information of the container cluster in the CCD, an instantiation parameter of a to-be-created container cluster instance, for example, name or identification information of the container cluster descriptor CCD, a size of the container cluster, a quantity of CISM instances and a quantity of CIS instances created during initialization of the container cluster, and an affinity/anti-affinity rule between the CISM instances, between the CIS instances, and between the CISM instances and the CIS instances in the container cluster.

The management entity may use the deployment information of the container cluster in the container cluster descriptor CCD as the instantiation parameter of the container cluster instance, or may determine the instantiation parameter of the container cluster instance with reference to input of another network element system (such as an OSS/BSS) based on satisfying the deployment information.

Step 503: The management entity sends a container cluster creation request to the container cluster management CCM, where the request message carries a size of the to-be-created container cluster, a quantity of CISM instances and a quantity of CIS instances that are created during initialization of the container cluster, and an affinity/anti-affinity rule between the CISM instances, between the CIS instances, and between the CISM instances and the CIS instances in the container cluster.

Step 504: The CCM returns a container cluster creation response to the management entity, to indicate that the container cluster creation request message is successfully received.

Step 505: The CCM sends a change notification of the container cluster management process to the management entity, to indicate, to the management entity, that the container cluster instantiation process starts.

Step 506: The management entity obtains identification information of a container cluster node descriptor CCND of a to-be-created container cluster node instance from a container cluster descriptor CCD, and obtains a CCND file by using the identification information of the CCND; and the management entity accesses the CCND to obtain deployment information of the to-be-created container cluster node instance.

Step 507: The management entity determines, based on the deployment information of the container cluster node in the CCND, an instantiation parameter of a to-be-created container cluster node instance, for example, a type of the container cluster node and an affinity/anti-affinity group to which the container cluster node belongs.

Step 508: The management entity sends a container cluster node creation request to the container cluster management CCM, where the request message carries name or identification information of a descriptor of a to-be-created container cluster node, a type of the container cluster node, and an affinity/anti-affinity group to which the container cluster node belongs.

Step 509: The CCM returns a container cluster node creation response to the management entity, to indicate that the container cluster node creation request message is successfully received.

Optionally, as an alternative method of step 506 to step 509, the CCM obtains the identification information of the container cluster node descriptor CCND from the container cluster descriptor CCD, and determines the instantiation parameter of the container cluster node by accessing the container cluster node descriptor CCND.

Similarly, the CCM may use the deployment information of the container cluster in the container cluster descriptor CCD as the instantiation parameter of the container cluster instance, or may determine the instantiation parameter of the container cluster instance with reference to input of another network element system (such as an OSS/BSS) based on satisfying the deployment information.

Step 510: The CCM completes a process of creating an initialized container cluster node in a to-be-created container cluster, so as to locally complete creation of a container cluster instance. Further, the CCM accesses the container cluster descriptor CCD to obtain software image (image) information of the to-be-deployed CISM instance and/or CIS instance, and deploys the CISM instance and the CIS instance on the container cluster node (optionally, the CIS instance may also be created by using the created CISM instance), and the CCM creates information about the container cluster instance, for example, CCD identification information and version used by the instantiated container cluster instance, instantiation status, scaling status, allowed maximum scaling level, external network information, and node resource information.

It should be noted that the software image of the CISM instance and/or the software image of the CIS instance may be stored in a package file of a container cluster in the NFV-MANO management domain, or may be stored in a software image registry (image registry) outside the NFV-MANO management domain, and the container cluster descriptor CCD includes index information pointing to a package file of a container cluster that stores the software image of the CISM instance and/or the software image of the CIS instance or a directory address of the external software image registry.

Step 511: The CCM sends a change notification of a container cluster management process to the management entity, and sends a container cluster instantiation end notification message to the management entity.

Figure 6:
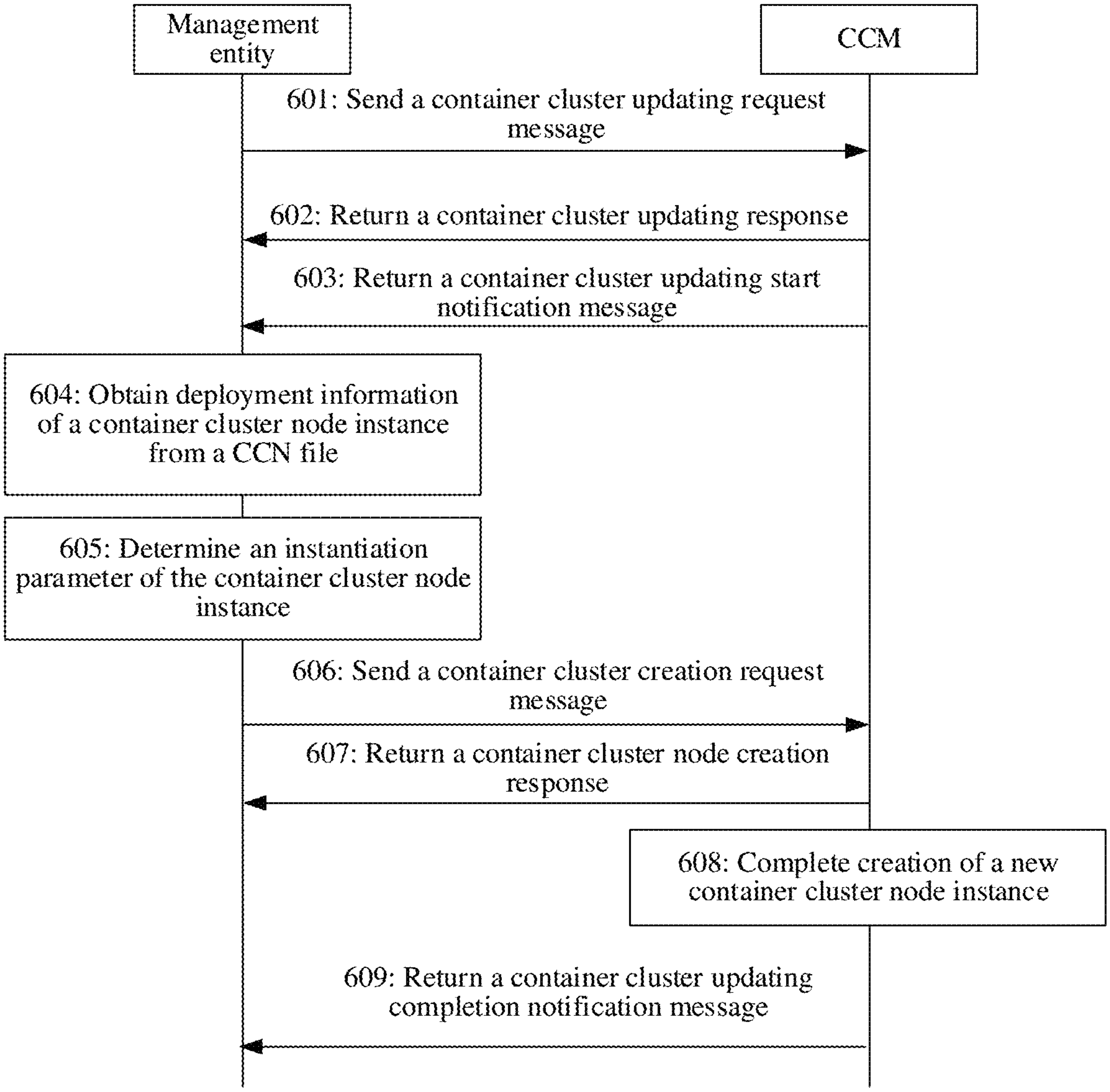
FIG. 6 is a schematic flowchart of updating a container cluster according to embodiments of this application.

Embodiment 2 of the present invention provides a container cluster updating method. As shown in FIG. 6, the method specifically includes the following steps:

Step 601: A management entity sends a container cluster updating request to a container cluster management CCM, where the request message carries identification information of a to-be-updated container cluster instance, a type of an updating operation being scaling, a size of a target container cluster reached by the scaling or a scaling level, and an affinity/anti-affinity rule between nodes of the target container cluster of the scaling.

Step 602: The CCM returns a container cluster updating response to the management entity, to indicate that the container cluster updating request message is successfully received.

Step 603: The CCM sends a change notification of the container cluster management process to the management entity, to indicate, to the management entity, that the container cluster updating process starts.

Step 604: The management entity obtains, from the container cluster descriptor CCD, identification information of a container cluster node descriptor CCND of a to-be-updated container cluster node instance, and obtains a CCND file by using the identification information of the CCND; and the management entity accesses the CCND to obtain deployment information of the to-be-created container cluster node instance.

Step 605: The management entity determines, based on the deployment information of the container cluster node instance in the CCND, an instantiation parameter of the to-be-created container cluster node instance, for example, name or identification information of a container cluster node descriptor, a type of the container cluster node, and an affinity/anti-affinity group to which the container cluster node belongs.

Step 606: The management entity sends a container cluster node creation request message to the container cluster management CCM, where the request message carries a type of a to-be-created container cluster node instance and an affinity/anti-affinity group to which the container cluster node instance belongs.

Step 607: The CCM returns a container cluster node creation response to the management entity, to indicate that the container cluster node creation request message is successfully received.

Optionally, as an alternative method of step 604 to step 607, the CCM obtains the identification information of the container cluster node descriptor CCND from the container cluster descriptor CCD, and determines the instantiation parameter of the container cluster node by accessing the container cluster node descriptor CCND.

Step 608: The CCM completes a process of creating a container cluster node instance in the to-be-updated container cluster, and locally generates information about the newly created container cluster node instance.

Step 609: The CCM returns a container cluster updating completion notification message to the management entity, to indicate, to the management entity, that the container cluster updating process ends.

Figure 7:
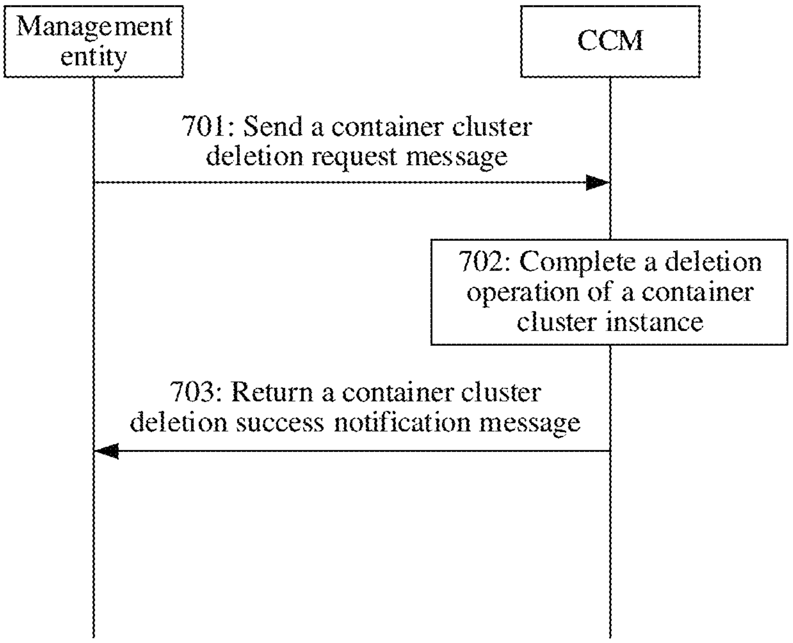
FIG. 7 is a schematic flowchart of deleting a container cluster according to embodiments of this application.

Embodiment 3 of the present invention provides a container cluster deletion method. As shown in FIG. 7, the method specifically includes the following steps:

Step 701: A management entity sends a deletion request message of the container cluster to a container cluster management CCM, where the request message carries identification information of a to-be-deleted container cluster instance, and/or a type of a deletion operation, for example, a forceful deletion (Forceful deletion) or a graceful deletion (Graceful deletion).

Step 702: The CCM locally uninstalls the CISM instance and/or the CIS instance in the to-be-deleted container cluster based on the type of the deletion operation in the request message, releases a layer I resource occupied by the container cluster node, deletes the container cluster node instance, and deletes the container cluster instance. In addition, the CCM deletes information about the container cluster instance.

Step 703: The CCM returns a container cluster deletion response to the management entity, to indicate that the container cluster instance is successfully deleted.

In this embodiment of the present invention, an information model that defines a container cluster descriptor CCD and a container cluster node descriptor CCND is added to the NFV template. The CCD mainly includes a size of the cluster, scaling attributes, and affinity/anti-affinity rules of object instances in the cluster. The CCND includes types of the nodes, requirements of the nodes for hardware acceleration, network interfaces, and local storage, and affinity/anti-affinity rules between the nodes in the container cluster. In a process of creating, updating, or deleting a container cluster, the management entity accesses the CCD to obtain information about the container cluster to be created, updated, or deleted, accesses the CCND to obtain information about nodes in the container cluster, and sends a request for creating, updating, or deleting the container cluster to the CCM based on the information. The CCM returns a response to the management entity after completing the creation, update, or deletion of the container cluster.

By implementing the methods in the foregoing embodiments, the solutions in embodiments of the present invention can support dynamic management of a container cluster, and implement large-scale container cluster consistent deployment and batch replication.

The foregoing mainly describes the solutions provided in embodiments of this application from a perspective of interaction between network elements. It may be understood that, to implement the foregoing functions, the NFVO, the VNFM, the CCM, or the like includes corresponding hardware structures and/or software modules for performing the functions. A person skilled in the art should be easily aware that, in combination with units and algorithm operations of the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, functional modules in the NFVO, the VNFM, the CCM, or the like may be divided based on the foregoing method examples. For example, functional modules may be divided corresponding to the functions, or two or more functions may be integrated into one processing module. The integrated module may be implemented in a form of hardware, or may be implemented in a form of a software functional module. It should be noted that division of the modules in embodiments of this application is an example, and is merely division of logical functions. During actual implementation, another division manner may be used.

Figure 8:
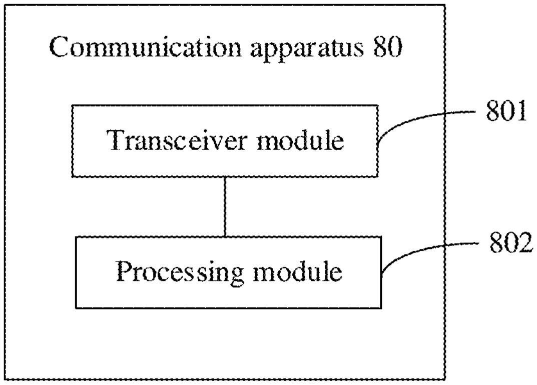
FIG. 8 is a schematic module diagram of a management entity apparatus according to embodiments of this application.

For example, when the functional modules are divided in an integrated manner, FIG. 8 shows a schematic diagram of a structure of a communication apparatus 80. The communication apparatus 80 includes a transceiver module 801 and a processing module 802.

For example, the communication apparatus 80 is configured to implement a function of the NFVO or the VNFM. For example, the communication apparatus 80 is the NFVO or the VNFM in the embodiment shown in FIG. 5, the embodiment shown in FIG. 6, or the embodiment shown in FIG. 7.

In embodiments of this application, the communication apparatus 80 may be the NFVO or the VNFM, or may be a chip applied to the NFVO or the VNFM, or another combined device or component having the function of the foregoing NFVO or VNFM. When the communication apparatus 80 is the NFVO or the VNFM, the transceiver module 801 may be a transceiver which may include an antenna, a radio frequency circuit, and the like, and the processing module 802 may be a processor (or a processing circuit), for example, a baseband processor which may include one or more CPUs. When the communication apparatus 80 is the component having the function of the foregoing NFVO or VNFM, the transceiver module 801 may be a radio frequency unit, and the processing module 802 may be a processor (or a processing circuit), for example, a baseband processor. When the communication apparatus 80 is a chip system, the transceiver module 801 may be an input/output interface of the chip (for example, a baseband chip), and the processing module 802 may be a processor (or a processing circuit) of the chip system, and may include one or more central processing units. It should be understood that the transceiver module 801 in embodiments of this application may be implemented by a transceiver or a transceiver-related circuit component, and the processing module 802 may be implemented by a processor or a processor-related circuit component (or referred to as a processing circuit).

For example, the transceiver module 801 may be configured to perform all receiving and sending operations performed by the NFVO or the VNFM in the embodiment shown in FIG. 5, for example, S503, and/or configured to support another process of the technology described in this specification. The processing module 802 may be configured to perform all operations, except the receiving and sending operations, performed by the NFVO or the VNFM in the embodiment shown in FIG. 5, for example, S501, S502, and S505, and/or configured to support another process of the technology described in this specification.

For another example, the transceiver module 801 may be configured to perform all receiving and sending operations performed by the NFVO or the VNFM in the embodiment shown in FIG. 6, for example, S603, and/or configured to support another process of the technology described in this specification. The processing module 802 may be configured to perform all operations, except the receiving and sending operations, performed by the NFVO in the embodiment shown in FIG. 6, for example, S601, S602, and S605, and/or configured to support another process of the technology described in this specification.

For another example, the transceiver module 801 may be configured to perform all receiving and sending operations performed by the NFVO or the VNFM in the embodiment shown in FIG. 7, for example, S701, and/or configured to support another process of the technology described in this specification. The processing module 802 may be configured to perform all operations, except the receiving and sending operations, performed by the NFVO in the embodiment shown in FIG. 6, for example, S703, and/or configured to support another process of the technology described in this specification.

Similarly, the communication apparatus 80 may also be configured to implement a function of the CCM, which is the CCM in the embodiment shown in FIG. 5, the embodiment shown in FIG. 6, or the embodiment shown in FIG. 7, and perform all operations performed by the CCM in the embodiments shown in FIG. 5 to FIG. 7, and details are not described again.

Figure 9:
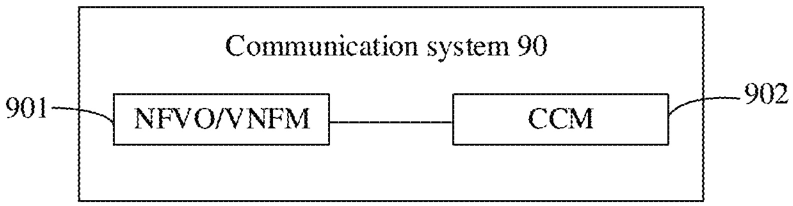
FIG. 9 is a schematic module diagram of a CCM apparatus according to embodiments of this application.

FIG. 9 shows a schematic composition diagram of a communication system. As shown in FIG. 9, the communication system 90 may include a management entity 901 and a CCM 902. It should be noted that FIG. 9 is merely an example of an accompanying drawing, and network elements included in the communication system 90 shown in FIG. 9 and a quantity of the network elements are not limited in embodiments of this application.

The NFVO 901 is configured to implement functions of the management entity 901 in the method embodiments shown in FIG. 5 to FIG. 7. For example, the management entity 901 may be configured to: access a container cluster descriptor file CCD, obtain deployment information of a to-be-created container cluster from the file, determine an instantiation parameter of the container cluster based on the deployment information of the container cluster in the CCD, and send a container cluster creation request to the container cluster management CCM, where the request message carries the instantiation parameter of the to-be-created container cluster.

The CCM 902 is configured to implement functions of the CCM in the method embodiments shown in FIG. 5 to FIG. 7. For example, the CCM 902 returns a container cluster creation response to the management entity 901, to indicate that the container cluster is successfully or unsuccessfully created and a cause of the unsuccessful creation, locally creates a container cluster instance, and completes initial creation of a specified quantity of container cluster nodes.

It should be noted that, all related content of the steps in the foregoing method embodiments may be quoted to function descriptions of corresponding network elements of the communication system 90, and details are not described herein again.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or some of the functions described above.

Figure 10:
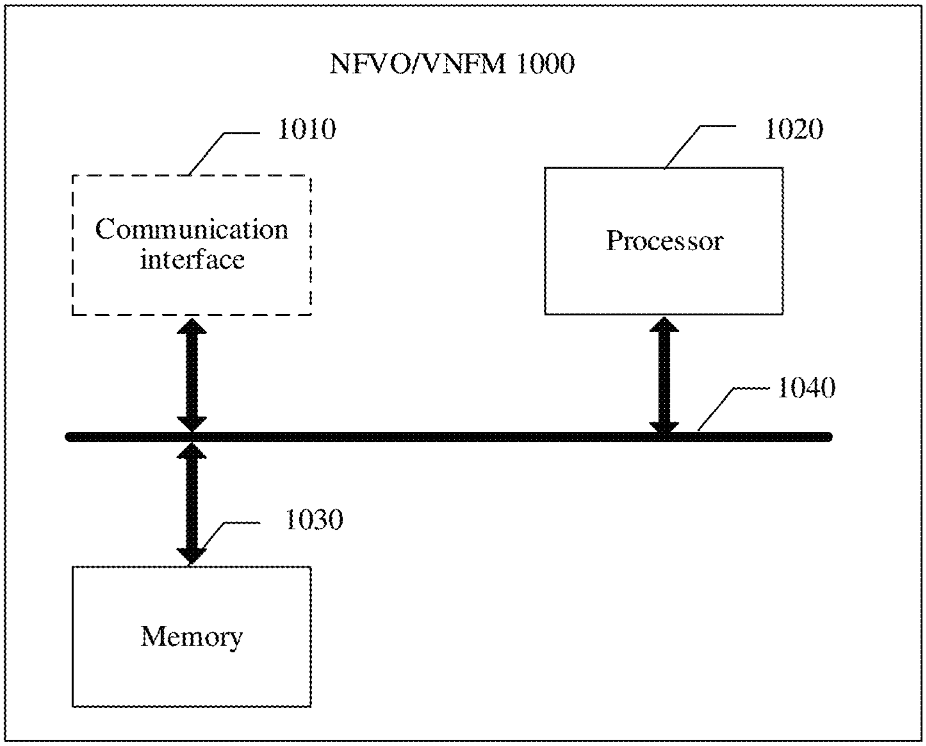
FIG. 10 is a schematic diagram of a hardware structure of a management entity apparatus according to embodiments of this application.

An embodiment of this application provides a computing device 1000, as shown in FIG. 10, including at least one memory 1030, configured to store a program instruction and/or data. The memory 1030 is coupled to a processor 1020. The processor 1020 implements a corresponding function by running the stored program instruction and/or processing the stored data. The computing device 1000 may be the NFVO or the VNFM in the embodiments shown in FIG. 5 to FIG. 7, and can implement the function of the NFVO or the VNFM in the method provided in the embodiments. The computing device 1000 may be a chip system. In embodiments of this application, the chip system may include a chip, or may include a chip and another discrete device.

The computing device 1000 may further include a communication interface 1010, configured to communicate with another device by using a transmission medium. For example, the another device may be a control device. The processor 1020 may receive and send data through the communication interface 1010.

A specific connection medium between the communication interface 1010, the processor 1020, and the memory 1030 is not limited in embodiments of this application. In this embodiment of this application, the memory 1030, the processor 1020, and the communication interface 1010 are connected to each other by using a bus 1040 in FIG. 10. The bus is represented by using a bold line in FIG. 10. A manner of connection between other components is only schematically described, but is not used as a limitation. The bus may be classified as an address bus, a data bus, a control bus, or the like. For ease of description, the bus in FIG. 10 is represented by using only one bold line, but which does not indicate that there is only one bus or one type of bus.

In embodiments of this application, the processor 1020 may be a general-purpose processor, a digital signal processor, an application-specific integrated circuit, a field programmable gate array or another programmable logic device, a discrete gate or a transistor logic device, or a discrete hardware component, and may implement or perform the methods, steps, and logical block diagrams disclosed in embodiments of this application. The general purpose processor may be a microprocessor, any conventional processor, or the like. Steps of the methods disclosed with reference to embodiments of this application may be directly executed and completed by means of a hardware processor, or may be executed and completed by using a combination of hardware and software modules in the processor.

In embodiments of this application, the memory 1030 may be a nonvolatile memory such as a hard disk drive (HDD) or a solid-state drive (SSD), or may be a volatile memory, for example, a random-access memory (RAM). The memory is any other medium that can carry or store expected program code in a form of an instruction or a data structure and can be accessed by a computer, but is not limited thereto. The memory according to embodiments of this application may be further a circuit or any other apparatus that can implement a storage function, and is configured to store a program instruction and/or data.

Figure 11:
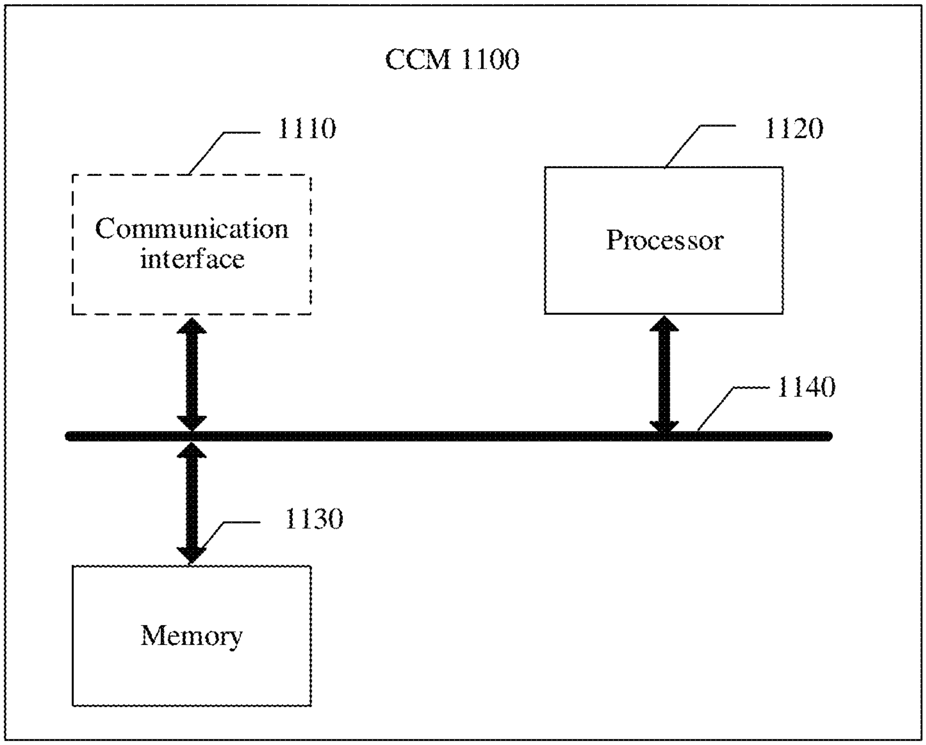
FIG. 11 is a schematic diagram of a hardware structure of a CCM apparatus according to embodiments of this application.

Embodiments of this application further provide a computing device 1100, as shown in FIG. 11, including at least one memory 1130, configured to store a program instruction and/or data. The memory 1130 is coupled to a processor 1120. The processor 1120 implements a corresponding function by running the stored program instruction and/or processing the stored data. The computing device 1000 may be the CCM in the embodiments shown in FIG. 5 to FIG. 7, and can implement the function of the CCM in the method provided in the embodiments.

The computing device 1100 also includes a communication interface 1110, configured to communicate with another device by using a transmission medium. The processor 1120 may receive and send data through the communication interface 1110.

Other functions and structures are similar to those of the foregoing computing device 1000, and details are not described herein again.

Embodiments of this application further provide a computer-readable storage medium, configured to store an instruction. When the instruction is executed by a processor of a computing device, the computing device is enabled to implement the method provided in any embodiment of this application.

Embodiments of this application further provide a computer program product, where the computer program product includes computer program code. When the computer program code is run on a computing device, the computing device is enabled to perform the method provided in any embodiment of this application.

A person of ordinary skill in the art may be aware that, in combination with the examples of units and algorithm steps described in the embodiments disclosed in this specification, this application may be implemented by using electronic hardware or a combination of computer software and electronic hardware. Whether the functions are executed in a mode of hardware or software depends on particular applications and design constraint conditions of the technical solutions. Persons skilled in the art may use different methods to implement the described functions for each particular application, but it should not be considered that the implementation goes beyond the scope of embodiments of this application.

Finally, it should be noted that the foregoing embodiments are merely intended for describing the technical solutions of this application, but not for limiting this application. Although this application is described in detail with reference to the foregoing embodiments, a person of ordinary skill in the art should understand that modifications may still be made to the technical solutions provided in the foregoing embodiments or equivalent replacements may be made to some technical features thereof, without departing from the scope of the technical solutions provided in embodiments of this application.

What is claimed is:

1. A method, comprising:

receiving, by a container cluster manager (CCM), a first instantiation request message of a container cluster from a management entity, wherein the first instantiation request message carries an instantiation parameter of the container cluster; and instantiating, by the CCM, the container cluster based on the instantiation parameter of the container cluster, wherein the instantiation parameter of the container cluster is determined by the management entity by accessing a container cluster descriptor (CCD); and wherein the instantiation parameter of the container cluster comprises an affinity/anti-affinity rule between container infrastructure service management (CISM) instances, between container infrastructure service (CIS) instances, and between the CISM instances and the CIS instances in the container cluster.

2. The method according to claim 1, wherein instantiating, by the CCM, the container cluster based on the instantiation parameter of the container cluster comprises:

obtaining an instantiation parameter of a container cluster node by:

receiving, by the CCM, a second instantiation request message of the container cluster node from the management entity, wherein the second instantiation request message carries the instantiation parameter of the container cluster node, and the instantiation parameter of the container cluster node is determined by the management entity by accessing a container cluster node descriptor (CCND); or accessing, by the CCM, the CCND to determine the instantiation parameter of the container cluster node; and instantiating, by the CCM, the container cluster node based on the instantiation parameter of the container cluster node, and instantiating a container infrastructure service management (CISM) instance or a container infrastructure service (CIS) instance on the container cluster node based on the instantiation parameter of the container cluster.

3. The method according to claim 2, wherein instantiating, by the CCM, the CISM instance or the CIS instance on the container cluster node based on the instantiation parameter of the container cluster comprises:

creating, by the CCM, the CISM instance or the CIS instance on the container cluster node; or creating, by the CCM, the CISM instance on the container cluster node, and further creating, by the CISM instance, the CIS instance on the container cluster node.

4. The method according to claim 2, wherein the instantiation parameter of the container cluster node comprises one or more of the following: name or identification information of the CCND, a type of the container cluster node, or an affinity/anti-affinity group to which the container cluster node belongs.

5. The method according to claim 1, wherein the instantiation parameter of the container cluster further comprises one or more of the following: name or identification information of the CCD, a size of the container cluster, or a quantity of CISM instances and a quantity of CIS instances created during initialization of the container cluster.

6. A communication apparatus, comprising:

a transceiver;

at least one processor; and one or more memories coupled to the at least one processor and storing programming instructions for execution by the at least one processor, wherein execution of the programming instructions causes the communication apparatus to:

receive a first instantiation request message of a container cluster from a management entity, wherein the first instantiation request message carries an instantiation parameter of the container cluster; and instantiate the container cluster based on the instantiation parameter of the container cluster, wherein the instantiation parameter of the container cluster is determined by the management entity by accessing a container cluster descriptor (CCD); and wherein the instantiation parameter of the container cluster comprises an affinity/anti-affinity rule between container infrastructure service management (CISM) instances, between container infrastructure service (CIS) instances, and between the CISM instances and the CIS instances in the container cluster.

7. The communication apparatus according to claim 6, wherein execution of the programming instructions further causes the communication apparatus to:

obtain an instantiation parameter of a container cluster node by:

receiving a second instantiation request message of the container cluster node from the management entity, wherein the second instantiation request message carries the instantiation parameter of the container cluster node, and the instantiation parameter of the container cluster node is determined by the management entity by accessing a container cluster node descriptor (CCND); or accessing the CCND to determine the instantiation parameter of the container cluster node; and instantiate the container cluster node based on the instantiation parameter of the container cluster node, and instantiate a CISM instance or a CIS instance on the container cluster node based on the instantiation parameter of the container cluster.

8. The communication apparatus according to claim 7, wherein execution of the programming instructions further causes the communication apparatus to:

create the CISM instance or the CIS instance on the container cluster node; or create the CISM instance on the container cluster node, wherein the CISM instance creates the CIS instance on the container cluster node.

9. The communication apparatus according to claim 7, wherein the instantiation parameter of the container cluster node comprises one or more of the following:

name or identification information of the CCND, a type of container cluster node, or an affinity/anti-affinity group to which the container cluster node belongs.

10. The communication apparatus according to claim 6, wherein the instantiation parameter of the container cluster further comprises one or more of the following: name or identification information of the CCD, a size of the container cluster, or a quantity of CISM instances and a quantity of CIS instances created during initialization of the container cluster.

11. A method, comprising:

accessing, by a management entity, a container cluster descriptor (CCD) and determining an instantiation parameter of a container cluster;

sending, by the management entity, the instantiation parameter of the container cluster to a container cluster management (CCM); and instantiating, by the CCM, the container cluster based on the instantiation parameter of the container cluster; and wherein the instantiation parameter of the container cluster comprises an affinity/anti-affinity rule between container infrastructure service management (CISM) instances, between container infrastructure service (CIS) instances, and between the CISM instances and the CIS instances in the container cluster.

12. The method according to claim 11, wherein instantiating, by the CCM, the container cluster based on the instantiation parameter of the container cluster comprises:

obtaining, by the CCM, an instantiation parameter of a container cluster node according to the following:

accessing, by the management entity, a container cluster node descriptor (CCND), and determining the instantiation parameter of the container cluster node, and sending, by the management entity, the instantiation parameter of the container cluster node to the CCM; or accessing, by the CCM, the CCND to determine the instantiation parameter of the container cluster node; and instantiating, by the CCM, the container cluster node based on the instantiation parameter of the container cluster node, and instantiating a CISM instance or a CIS instance on the container cluster node based on the instantiation parameter of the container cluster node.

13. The method according to claim 12, wherein instantiating, by the CCM, the CISM instance or the CIS instance on the container cluster node based on the instantiation parameter of the container cluster comprises:

creating, by the CCM, the CISM instance or the CIS instance on the container cluster node; or creating, by the CCM, the CISM instance on the container cluster node, and further creating, by the CISM instance, the CIS instance on the container cluster node.

14. The method according to claim 12, wherein the instantiation parameter of the container cluster node comprises one or more of the following: name or identification information of the CCND, a type of container cluster node, or an affinity/anti-affinity group to which the container cluster node belongs.

15. The method according to claim 11, wherein the instantiation parameter of the container cluster further comprises one or more of the following: name or identification information of the CCD, a size of the container cluster, or a quantity of CISM instances and a quantity of CIS instances created during initialization of the container cluster.

16. A system, comprising:

a management entity, configured to:

access a container cluster descriptor (CCD) and determine an instantiation parameter of the container cluster; and send the instantiation parameter of the container cluster to a container cluster management (CCM); and the CCM, configured to instantiate the container cluster based on the instantiation parameter of the container cluster; and wherein the instantiation parameter of the container cluster comprises an affinity/anti-affinity rule between container infrastructure service management (CISM) instances, between container infrastructure service (CIS) instances, and between the CISM instances and the CIS instances in the container cluster.

17. The system according to claim 16, wherein the management entity is further configured to:

access a container cluster node descriptor (CCND) and determine an instantiation parameter of a container cluster node; and send the instantiation parameter of the container cluster node to the CCM; and wherein the CCM is further configured to:

instantiate the container cluster node based on the instantiation parameter of the container cluster node, and instantiate a CISM instance or a CIS instance on the container cluster node based on the instantiation parameter of the container cluster node.

18. The system according to claim 17, wherein instantiating the CISM instance or the CIS instance on the container cluster node based on the instantiation parameter of the container cluster comprises:

creating the CISM instance or the CIS instance on the container cluster node; or creating the CISM instance on the container cluster node, and further creating, by the CISM instance, the CIS instance on the container cluster node.

19. The system according to claim 16, wherein the CCM is further configured to:

access a container cluster node descriptor (CCND) to determine an instantiation parameter of a container cluster node; and instantiate the container cluster node based on the instantiation parameter of the container cluster node, and instantiate a CISM instance or a container CIS instance on the container cluster node based on the instantiation parameter of the container cluster node.

* * * * *